United States Patent Office 3,488,729
Patented Jan. 6, 1970

3,488,729
CEPHALOTHIN ESTER
Robert R. Chauvette and Edwin H. Flynn, Indianapolis, Ind., assignors to Eli Lilly and Company, Indianapolis, Ind., a corporation of Indiana
No Drawing. Filed Aug. 22, 1966, Ser. No. 573,820
Int. Cl. C07d 99/24; A61k 21/00
U.S. Cl. 260—243                                   1 Claim

ABSTRACT OF THE DISCLOSURE

This disclosure is directed to a chemical compound which is named acetoxymethyl 7-(2-thienylacetamido)cephalosporanate. It is useful as an antibiotic.

---

This invention relates to cephalosporin antibiotics. More particularly, this invention provides a unique orally administrable cephalosporin ester for combating microbial infections.

7-(thiophene - 2 - acetamido)cephalosporanic acid was found some time ago to be an outstanding cephalosporin compound. It has desirable antibacterial activity against both Gram-positive and Gram-negative organisms and penicillin-resistant staphylococci in the laboratory and in the clinical situation. However, to date the compound has usually been administered by intramuscular or subcutaneous injections of salts of such acid in aqueous media. No satisfactory form of this drug has been found which is very effective as an antibiotic or as a bacteriostat when the drug form is administered orally. The pharmaceutical art has been looking for and is in need of this desirable drug in a form which will overcome this peculiar lack of oral efficacy.

Various modifications of the chemical structure of 7-(2-thiopheneacetamido)cephalosporanic acid have been tried by us in an attempt to find a form of this drug which would have increased oral absorption ability while retaining biological activity. We have tried numerous amide and ester forms of this acid but from this study only the one ester of this invention has been found to provide this drug in significant concentrations in the blood when administered by the oral route.

It is thus an object of this invention to provide a new orally effective cephalosporin-type antibiotic.

It is a further object of this invention to provide a new ester form of 7-(2-thiopheneacetamido)cephalosporanic acid, which ester may be taken or administered orally to combat microbial infections.

Briefly, this invention provides acetyloxymethyl 7-(2-thiopheneacetamido)cephalosporanate as a new ester compound which may be used to combat Gram-positive and Gram-negative microbial infectious organisms in preventing and alleviating the disease effects of such organisms. This compound is unique in that it may be taken or administered orally and absorbed from the alimentary tract to obtain anti-bacterially effective levels of the drug in the blood.

The acetoxymethyl 7-(thiophene - 2 - acetamido)cephalosporanate ester of this invention has the formula:

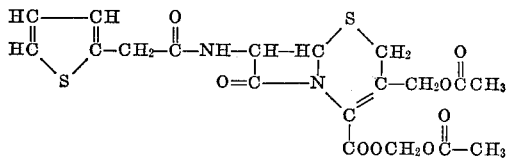

The 7-(thiophene - 2 - acetamido)cephalosporanic acid is a known compound, having been described, e.g., as the sodium salt in the Journal of the American Chemical Society, vol. 84, pages 3401–3402 (1962). This acid is also referred to by some authorities as 7-(2-thienylacetamido)cephalosporanic acid. The acetoxymethyl ester of 7-(2 - thiopheneacetamido)cephalosporanic acid of this invention can be prepared by conventional esterification procedures. One such procedure which can be used is to condense the 7-(2 - thiopheneacetamido)cephalosporanic acid either as the free acid or in a water-soluble salt form with a chloromethyl acetate or bromomethyl acetate in an appropriate solvent such as a dialkylacylamide, e.g., dimethylformamide or dimethylacetamide.

The acetoxymethyl 7 - (2 - thiopheneacetamido)cephalosporate ester which results may be separated from the esterification reaction medium by conventional methods such as filtering the reaction mixture, removing solvent by evaporation, recrystallization from a solvent to purify the product, drying the product, chromatography procedures, and the like.

A procedure for preparing the compound of this invention is illustrated by the following detailed example.

EXAMPLE

To a suspension of 12.6 g. (30 mmoles) sodium 7-(2 - thiopheneacetamido)cephalosporanic acid salt in 75 ml. of dimethylacetamide there was added a solution of 3.5 g. (33 millimole) chloromethyl acetate [prepared by the method of M. Descudé, Bull. Soc. Chim. France [3], 27, page 867 (1902)], still containing bis(chloromethyl) ether to the extent of 20–25 percent after repeated distillations, in 25 ml. of dimethylacetamide. The resulting mixture was stirred at room temperature for five hours, filtered, and concentrated under vacuum to remove the solvent. The residue was taken up in ethylene chloride, washed with phosphate buffer (0.1 M, pH 7), dried over magnesium sulfate, and evaporated to dryness. The amorphous residue weighed nearly 5 grams. A thin-layer chromatogram of this crude material using a silica gel plate developed with ethylene chloride-ethyl ether in a 1:2 volume ratio, indicated three components. A bioautogram also indicated three components. A 2.4 g. sample of the crude product was chromatographed over 150 g. of silica using 1:3 ratio ethylene chloride-ethyl ether mixture as eluant. The progress of the separation was followed by thin-layer chromatography on the residues from evaporation of periodic fractions. Those fractions which contained a material corresponding to the leading spot in the thin-layer chromatogram of the mixture were combined to give 500 mg. of a white powder product which, after repeated crystallizations from methylene chloride-diisopropyl ether, was characterized as the acetoxymethyl ester of cephalothin, i.e., the acetoxymethyl 7-(2 - thiopheneacetamido)cephalosporanate ester, M.P. 91–93° C.

*Analysis.*—Calculated for $C_{19}H_{20}N_2O_8S_2$: C, 48.71; H, 4.30; N, 5.98. Found: C, 49.11; H, 4.86; N, 5.98.

The structure was also confirmed by infrared and nuclear magnetic resonance spectra.

The acetoxymethyl ester of 7-(2-thiopheneacetamido)-cephalosporanic acid can be administered orally for use as an antibiotic. The sodium salt of 7-(2 - thiopheneacetamido)cephalosporanic acid, which is a commercially available form of this antibiotically active acid, is administered parenterally to get the drug into the bloodstream quickly. The new ester form of the drug provides a method for getting the drug into the blood by the oral route.

The acetoxymethyl 7-(2 - thiopheneacetamido)cephalosporanate ester of this invention was administered orally to two mice at a dose of 40 mg. of the ester per kilogram of weight of the mouse, and the blood level of the drug was determined by the method of Wick and Boniece described in Applied Microbiology, March 1965, volume 13, page 349, except that the organism *Bacillus subtilis* ATCC 6633 was substituted for the *Sarcina lutea* PC 1–1001–FDA mentioned in the article. The drug contents in the blood samples taken from the mice were as follows:

| | Time after oral administration (hours) | Concentration of drug in mouse blood (micrograms/ml.) |
|---|---|---|
| Mouse No.: | | |
| 1 | 0.5 | 37 |
| | 1 | [1]<15 |
| 2 | 0.5 | [1]<15 |
| | 1.0 | 22 |

[1] The concentration of 15 micrograms of drug per milliliter of blood was the lowest concentration readable by the test method used.

It will be appreciated that the dosage of the new compound of this invention will vary over a wide range depending upon the age and weight of the patient to be treated, and upon the particular ailment to be treated. For these reasons tablets, pills, capsules and the like containing for example, 125, 250 and 500 mg. or more of the acetoxymethyl 7-(2 - thiopheneacetamido)cephalosporanate can be made available for the adjustment of the dosage to the individual patient. In general, the dosages administered are those which provide a blood level of the free 7-(2 - thiopheneacetamido)cephalosporanic acid, approximating the usual level obtained upon intramuscular injection of about 3 to about 6 mg./kg. of the free acid or salt form of the antibiotic.

We claim:
1. Acetoxymethyl 7 - (2 - thienylacetamido)cephalosporanate.

References Cited

UNITED STATES PATENTS

| 3,250,679 | 5/1966 | Jansen et al. | 260—239.1 |
| 3,252,973 | 5/1966 | Flynn | 260—239.1 |
| 3,284,451 | 11/1966 | Cheney et al. | 260—239.1 |

OTHER REFERENCES

Chauvette et al., Jour. American Chemical Society, vol. 84, pp. 3401–3402 (1962).

NICHOLAS S. RIZZO, Primary Examiner

U.S. Cl. X.R.

424—246